US012800064B2

(12) United States Patent
Maywald et al.

(10) Patent No.: US 12,800,064 B2
(45) Date of Patent: Nov. 17, 2026

(54) VALVE FOR A REFRIGERATION APPLICATION

(71) Applicant: Danfoss A/S, Nordborg (DK)

(72) Inventors: Uwe Maywald, Nordborg (DK); Simon Ahrens Lassen, Kolding (DK); Bjarke Skovgård Dam, Almind (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/847,724

(22) PCT Filed: Feb. 1, 2023

(86) PCT No.: PCT/EP2023/052455
§ 371 (c)(1),
(2) Date: Sep. 17, 2024

(87) PCT Pub. No.: WO2023/179941
PCT Pub. Date: Sep. 28, 2023

(65) Prior Publication Data
US 2025/0067364 A1 Feb. 27, 2025

(30) Foreign Application Priority Data
Mar. 23, 2022 (DK) ............................. PA202200247

(51) Int. Cl.
*F16K 39/02* (2006.01)
*F16K 31/143* (2006.01)
(Continued)

(52) U.S. Cl.
CPC ............ *F16K 39/022* (2013.01); *F16K 41/04* (2013.01); *F25B 41/20* (2021.01); *F16K 31/143* (2013.01)

(58) Field of Classification Search
CPC .......... F16K 39/022; F16K 41/04; F16K 1/02; F16K 31/143; F16K 31/50; F16K 41/00; F16K 1/482; F25B 41/20; F25B 41/24
(Continued)

(56) References Cited

U.S. PATENT DOCUMENTS 1,111,244 A * 9/1914 Wilson ...................... F16K 5/12 251/282
1,389,955 A 9/1921 Mccracken
(Continued)

FOREIGN PATENT DOCUMENTS

CN 207470790 U 6/2018
CN 113700921 A 11/2021
(Continued)

OTHER PUBLICATIONS

International Search Report mailed on Apr. 13, 2023, in connection with corresponding International Application No. PCT/EP2023/052455 (2 pp.).
(Continued)

*Primary Examiner* — Matthew W Jellett
(74) *Attorney, Agent, or Firm* — McCormick, Paulding & Huber PLLC

(57) ABSTRACT

The present disclosure pertains to a valve for a refrigeration application, in particular a shut-off and/or regulating valve. The valve includes a bonnet connected to a housing with two fluid openings, a spindle fully penetrating the bonnet and reaching inside the housing, and a piston with an upper guiding and sealing portion with a seal section, a bottom closing portion for opening and closing a fluid passage between the two fluid openings, and a piston tube between the upper guiding and sealing portion and the bottom closing portion. The spindle engages the piston for moving it between a closed position and an open position of the valve
(Continued)

and a pressure balancing chamber is provided above and within the piston. The piston is sealed against the bonnet at the upper guiding and sealing portion. An inner surface of the bonnet guiding the upper guiding and sealing portion and/or an outer surface of the piston has a smaller diameter at a bottom portion than at an upper portion.

21 Claims, 7 Drawing Sheets

(51) Int. Cl.
*F16K 41/04* (2006.01)
*F25B 41/20* (2021.01)

(58) Field of Classification Search
USPC ........................ 251/63.5, 172, 190, 191, 282
See application file for complete search history.

(56) References Cited

U.S. PATENT DOCUMENTS

| | | | | | |
|---|---|---|---|---|---|
| 1,807,446 | A | * | 5/1931 | Smeby | F16K 39/022 137/625.37 |
| 2,152,831 | A | * | 4/1939 | Williams | F16K 39/022 251/210 |
| 2,470,470 | A | * | 5/1949 | Carbon | F16K 31/406 251/266 |
| 2,897,836 | A | * | 8/1959 | Peters | F16K 39/022 137/625.5 |
| 2,953,345 | A | | 9/1960 | Slemmons | |
| 3,318,577 | A | * | 5/1967 | Banks | F16K 1/425 251/38 |
| 3,331,583 | A | * | 7/1967 | Backer | F16K 31/122 251/282 |
| 3,379,210 | A | | 4/1968 | Wheeler | |
| 3,888,280 | A | | 6/1975 | Tartaglia | |
| 3,892,384 | A | * | 7/1975 | Myers | F16K 1/44 251/282 |
| 4,002,319 | A | | 1/1977 | Pool et al. | |
| 4,304,264 | A | | 12/1981 | McClintock et al. | |
| 4,341,370 | A | * | 7/1982 | Banks | F16K 39/022 74/552 |
| 4,440,379 | A | | 4/1984 | Behle et al. | |
| 4,923,173 | A | | 5/1990 | Szymaszek et al. | |
| 5,564,674 | A | * | 10/1996 | Kalin | F16K 31/408 251/38 |
| 5,586,483 | A | | 12/1996 | Sine | |
| 5,934,870 | A | * | 8/1999 | Zimmermann | F01D 17/145 251/282 |
| 5,996,369 | A | * | 12/1999 | Hirota | B60H 1/3204 251/118 |
| 6,568,656 | B1 | | 5/2003 | Wrocklage | |
| 8,469,333 | B2 | * | 6/2013 | Medina | F16K 31/12 251/282 |
| 2002/0134441 | A1 | | 9/2002 | Kusumoto et al. | |
| 2006/0005890 | A1 | | 1/2006 | Johnsen et al. | |
| 2010/0078084 | A1 | | 4/2010 | Zuck et al. | |
| 2012/0248355 | A1 | * | 10/2012 | Harada | F16K 31/047 251/129.11 |
| 2014/0223944 | A1 | | 8/2014 | Dam et al. | |
| 2016/0195317 | A1 | | 7/2016 | Dam et al. | |
| 2016/0201957 | A1 | | 7/2016 | Dam et al. | |
| 2016/0298889 | A1 | | 10/2016 | Dam et al. | |
| 2017/0191703 | A1 | | 7/2017 | Thomsen et al. | |
| 2018/0202566 | A1 | | 7/2018 | Parastar et al. | |
| 2018/0266568 | A1 | | 9/2018 | Gabriel | |
| 2019/0003607 | A1 | | 1/2019 | Lassen et al. | |
| 2025/0198538 | A1 | * | 6/2025 | Lassen | F16K 1/482 |

FOREIGN PATENT DOCUMENTS

| | | | |
|---|---|---|---|
| CN | 214662107 | U | 11/2021 |
| EP | 3064814 | A1 | 9/2016 |
| EP | 2505887 | B1 | 4/2018 |
| EP | 4496954 | A1 | 1/2025 |
| EP | 4496955 | A1 | 1/2025 |
| EP | 4553360 | A1 | 5/2025 |
| JP | 2674204 | B2 | 11/1997 |
| WO | 2023179940 | A1 | 9/2023 |
| WO | 2023179941 | A1 | 9/2023 |
| WO | 2024132265 | A1 | 6/2024 |

OTHER PUBLICATIONS

Danfoss, Shut-off and regulating valves for Industrial Refrigeration, Catalog, Nov. 2018, pp. 1-134, accessed at https://assets.danfoss.com/documents/latest/100452/AF251686497783en-000806.pdf (134 pages total).

* cited by examiner

VALVE FOR A REFRIGERATION APPLICATION

CROSS-REFERENCE TO RELATED APPLICATIONS

This application is a National Stage application of International Patent Application No. PCT/EP2023/052455, filed on Feb. 1, 2023, which claims priority to Danish Patent Application No. PA202200247, filed Mar. 23, 2022, each of which is hereby incorporated by reference in its entirety.

TECHNICAL FIELD

The present invention pertains to a valve for a refrigeration application, in particular a shut-off and/or regulating valve.

BACKGROUND

Valves for refrigeration applications are used for controlling refrigeration fluid flows between high pressure and low pressure portions of the applications. They are typically operated at high pressure gradients and corresponding high forces acting on a closure member, such as the valve's piston. Pressure balancing is provided in order to overcome the forces or reduce the net forces acting on the closure member, which are generated by the pressure difference over the closure member when the valve is closed or nearly closed. Pressure balanced valves are typically designed such that the pressure generated forces acting opposite to each other and in the axial direction of the closure member equal each other. A pressure balanced closure member requires only limited force to open and close the valve.

During the opening and closing of the valve, the valve piston also experiences considerable radial forces due to the high pressure gradient and flow conditions of the fluid passing past the closure member. These radial forces inhibit the axial movement of the piston and make it harder to open and close the valve. In order to reduce these high pressure gradients and the corresponding radial forces, it is known to provide pressure balancing chambers, which reduce the pressure gradient acting on the piston, in particular in the closed position of the valve. This facilitates in particular the initial movement of the piston, required for starting the opening of the valve. For the piston against the bonnet, seals are provided between the piston and the bonnet.

The known valves are typically operated in an open position of the valve most of the time, in which no high pressure gradient acts on the piston and in which the seals between the piston and the bonnet are not required to seal against a leak between the piston and the bonnet. Only when the valve is closed, a pressure gradient exists between the inside of the pressure balancing chamber and parts of the fluid passage. In this closed position of the valve, the seals between the piston and the bonnet seal the inside of the pressure balancing chamber against a portion of the fluid passage. This means that seals may only be actually needed during a negligible fraction of the time of the valve's total operating time.

In known valves, the seals are compressed during the total operating time of the valve, in which the valve remains mostly open. However, the seals are only actually needed during relatively short time intervals, in which the valve is in a closed position. The permanent compression of the seals accelerates their deterioration. As a result, the valve may start leaking, once the valve is actually put in a closed position or service and replacement activities may be required to ensure correct functioning of the valve.

SUMMARY

The aim of the present invention is to overcome the above outlined problem and to provide an improved valve.

This aim is reached by the valve according to claim 1 and by a set of such valves according to claim 15. Preferable embodiments are subject to the dependent claims.

According to claim 1, a valve for a refrigeration application, in particular a shut-off and/or regulating valve, is provided. The valve comprises a bonnet connected to a housing with two fluid openings, a spindle fully penetrating the bonnet and reaching inside the housing, and a piston with an upper guiding and sealing portion with a seal section, a bottom closing portion for opening and closing a fluid passage between the two fluid openings, and a piston tube between the upper guiding and sealing portion and the bottom closing portion, wherein the spindle engages the piston for moving it between a closed position and an open position of the valve, wherein a pressure balancing chamber is provided above and within the piston, wherein the piston is sealed against the bonnet at the upper guiding and sealing portion, and wherein an inner surface of the bonnet guiding the upper guiding and sealing portion and/or an outer surface of the piston has a smaller diameter at a bottom portion than at an upper portion.

The two different diameter portions of the bonnet and/or of the piston ensure that the seals are only significantly compressed in the closed position of the valve and preferably in positions of the valve, in which it is close to being closed, i.e. in positions in which the valve is partially open to a small degree. The seals may be significantly compressed at valve positions, at which the piston is moved from a closed position of the valve by up to e.g. 5%, 10% or 20% of the valve stroke. The larger diameter upper portion of the piston may correspond to the upper guiding and sealing portion. In open positions of the valve, the bonnet and the piston are spaced apart sufficiently in a radial direction for reducing the compression of the seal provided therein between. In open positions of the valve, the seals may not be compressed by the bonnet and the piston, as the bonnet and the piston are further spaced apart from each other in the area close to the seal.

The seals may comprise or consist of O-rings. The seals may be compressed approximately 20%±5% along the radial thickness of the O-ring in closed positions of the valve. This compression is completely or almost completely reduced in open or partially open positions of the valve. For example, in a closed position of the valve, an O-ring made of a toroidal ring with a circular cross-section and with 2 mm material thickness may be compressed by 0.2×2 mm=0.4 mm in a radial direction and along its entire circumference. In an open position of the valve, the diameter of the large diameter upper portion of the bonnet may be 0.8 mm larger than the small diameter bottom portion of the bonnet, such that the O-ring may expand to its initial 2 mm material thickness in the valve's open position.

At the same time, the presently described design makes it possible to provide a piston tube with a reduced central diameter, compared to the upper and lower portions of the piston. Consequently, mores space is provided around the piston tube. This means that a high pressure gradient acting on the piston tube acts on its considerably reduced surface area, i.e. in a radial direction of the piston, compared to valves known from prior art. As a result, the forces acting on the piston tube in a radial direction are reduced and the piston is less prone to getting stuck with the housing. The radial direction of the piston is parallel to a plane orthogonal to the longitudinal direction of the piston tube.

Furthermore, due to the reduced diameter of the piston tube, a larger volume for fluid flow is provided between the inside of the housing and the outside of the piston tube. This reduces the likelihood of turbulences around the piston tube, contributing to the valve's increased performance and reduced radial forces acting on the piston tube.

The bottom closing portion may open and close the fluid passage between the two fluid openings by way of inserting itself into the fluid passage for closing it and retracting itself from the fluid passage for opening it.

In a preferred embodiment of the invention, the smaller diameter bottom portion of the bonnet and/or the larger diameter upper portion of the piston extend about 2%, less than 5%, preferably less than 10% and more preferably less than 20% of the valve stroke in an axial direction of the valve. The extension of the smaller diameter bottom portion of the bonnet and/or of the larger diameter upper portion of the piston determines the valve positions, at which the bonnet is sealed against the piston.

The axial direction of the valve may correspond to the longitudinal direction of the spindle. A radial and circumferential direction of the valve may also be referenced to the spindle and may correspond to the radial and circumferential direction of the spindle.

In another preferred embodiment of the invention, the bonnet comprises two concentric protrusions formed as hollow cylinders, between which the upper guiding and sealing portion is at least partially guided. The two concentric protrusions, an inner and an outer protrusion, may be formed integrally with the bonnet. They make it possible for the piston to interact with the bonnet via two radially spaced apart surfaces.

In a particularly preferred embodiment of the invention, the inner protrusion abuts the spindle in a fully open position of the valve for sealing the valve against the outside. An inner edge of the inner protrusion may abut an outer edge of the spindle.

In another preferred embodiment of the invention, the pressure balancing chamber is connected to the fluid passage via a pressure balancing passage within the spindle and/or within the piston, and/or the piston is supported only by the spindle and the bonnet during at least some or all open positions of the valve. In the open positions of the valve, i.e. the partially and fully opened positions, the piston does not contact the housing. Rather it is only in contact with the spindle and the bonnet. The pressure balancing passage or passages may be oriented in an axial direction of the valve. There may be no radially oriented pressure balancing passages, although some portions of a generally axially oriented pressure balancing passage may extend in a radial direction.

In another preferred embodiment of the invention, the upper guiding and sealing portion comprises only the extreme end of the piston and/or corresponds to less than half, preferably less than a fourth or less than a fifth of the entire length of the piston. As the sealing portion is situated at the extreme upper end of the piston, the volume of the pressure balancing chamber and the valve stroke can be maximized, while the piston diameter can be kept to a minimum.

In another preferred embodiment of the invention, the piston is sealed against the bonnet only at the upper guiding and sealing portion. As the upper guiding and sealing portion may be the only sealing portion of the valve, which seals the piston against the bonnet, the short extension of this portion ensures that most of the piston is of considerably smaller diameter, yielding all the advantages described above.

In another preferred embodiment of the invention, the pressure balancing chamber is connected to the fluid passage via a pressure balancing passage within the bottom closing portion. The pressure balancing passage may therefore extend through the spindle and/or through the bottom closing portion. It may be divided into two or more longitudinal portions, which may be angled to each other, preferably at an angle of 90°.

In another preferred embodiment of the invention, the bonnet is formed integrally and/or inserted partially into the housing and/or connected directly to the housing. The integral bonnet may comprise the concentric protrusions, some connection geometry for connecting the bonnet to the housing, a thread for connecting the bonnet to the spindle and/or some walls bounding the pressure balancing chamber.

In another preferred embodiment of the invention, the spindle is coupled, preferably rotatably coupled, to a piston tube via balls. The balls may be inserted between the spindle and the piston tube via a hole within the piston tube. When the spindle is turned, the balls transfer an axial force between the spindle and the piston tube for moving the piston tube along together with the rotated and translated spindle.

In another preferred embodiment of the invention, a bushing is provided at or close to an extreme end of the spindle and between the spindle and the bottom closing portion. The bushing facilitates the relative rotation between the spindle and the piston. It may contact the bottom closing portion and/or the piston tube via a circumferential and/or circular face.

In another preferred embodiment of the invention, the bottom closing portion comprises an outer flange and an inner flange between which a sealing element is provided. The inner flange may be formed integrally with the piston tube. The inner flange may comprise threaded holes for screws and/or parts of the pressure balancing passage.

In another preferred embodiment of the invention, the seal section comprises at least one or exactly two seals. Alternatively, at least one seal is or exactly two seals are fixedly coupled to the bonnet.

In another preferred embodiment of the invention, a sliding sleeve is provided between the piston and the bonnet. The sliding sleeve may be in contact with the upper guiding and sealing portion, at least in the open positions of the valve. It may comprise a complex inner geometry with a smaller inner diameter at a bottom portion than at an upper portion. It may be regarded as part of the bonnet but it is not formed integrally with the bonnet. It may be welded to the bonnet or otherwise connected to the bonnet.

The invention is also directed at a set comprising two of the presently described valves, wherein the valves are fluidly connected to a port for a third valve, wherein the port is provided between the two valves. The port can be connected to a third and possibly different valve. If the third valve needs to be exchanged or serviced, the two presently described valves can be shut to disconnect the third valve from any fluid flow.

BRIEF DESCRIPTION OF THE DRAWINGS

Further details and advantages of the invention are described with reference to the figures. The figures show.

DETAILED DESCRIPTION

Figure 1:
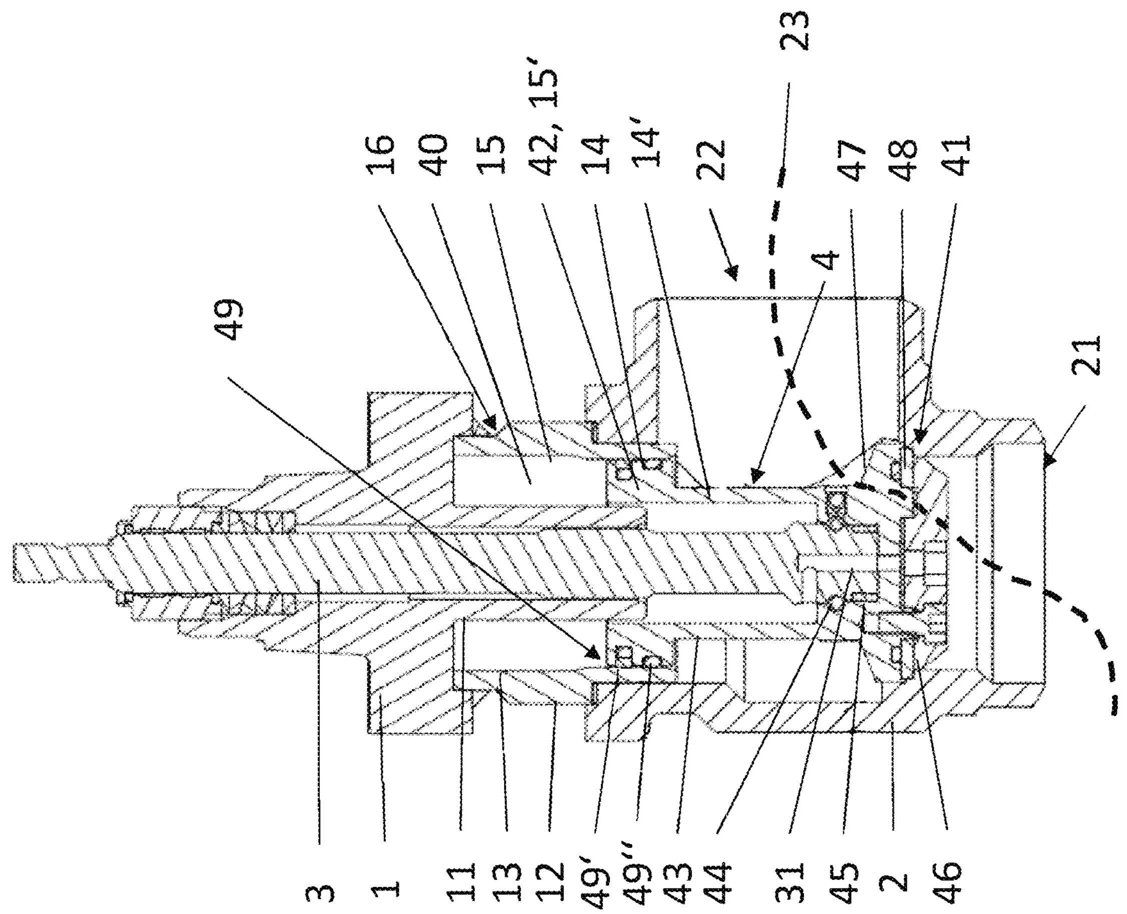
FIG. 1: sectional view of an embodiment of the valve in its closed position.

FIG. 1 is a sectional view of an embodiment of the valve in its closed position. The valve may be provided for a refrigeration application. It may be a shut-off and/or regulating valve. The valve comprises a bonnet 1 connected to a housing 2 with two fluid openings 21, 22. The fluid openings may be at an angle of e.g. 90° to each other.

The valve further comprises a spindle 3 fully penetrating the bonnet 1 and reaching inside the housing 2. Inside the bonnet 1 and the housing, a piston 4 with an upper guiding and sealing portion 42 is provided. The upper guiding and sealing portion 42 comprises a seal section 49 for sealing the piston 4 against the bonnet 1. The seal section 49 comprises at least one or exactly two seals 49', 49".

The piston 4 further comprises a bottom closing portion 41 for opening and closing a fluid passage 23 between the two fluid openings 21, 22, and a piston tube 43 between the upper guiding and sealing portion 42 and the bottom closing portion 41. The spindle 3 engages the piston 4 for moving it between a closed position and an open position of the valve.

A pressure balancing chamber 40 is provided above and within the piston 4. The pressure balancing chamber changes in shape and in size in dependence on the valve's position. In the closed position of the valve shown here, the pressure balancing chamber 40 is at its maximum size. The pressure balancing chamber 40 may comprise two large hollow cylindrical sub-chambers, an external hollow cylindrical sub-chamber and an internal hollow cylindrical sub-chamber, which are connected via an intermediate hollow cylindrical sub-chamber. The internal hollow cylindrical sub-chamber may be the radially innermost sub-chamber and the external hollow cylindrical sub-chamber may be the radially outermost sub-chamber. The pressure balancing chamber 40 is connected to the fluid passage 23 via a pressure balancing passage 31. The pressure balancing passage 31 may be aligned at least partially along a central axis of the spindle 3.

The piston 4 is sealed against the bonnet 1 at the upper guiding and sealing portion 42. This sealing is only present in the closed position of the valve and preferably at positions of the valve close to its closed position. Some sealing may be present in partially opened positions of the valve. In the fully opened position and in all or most partially opened positions of the valve, no effective sealing is present between the piston 4 and the bonnet 1.

An inner surface 13 of the bonnet 1 may guide the upper guiding and sealing portion 42 in partially opened positions of the valve. Alternatively or additionally, an outer surface of the piston 4 has a smaller diameter at a bottom portion 14, 14' than at an upper portion 15, 15'. The smaller diameter bottom portion 14' of the piston 4 is not necessarily the bottom-most portion of the piston 4.

The essential feature of the invention is that the inner surface 13 of the bonnet and/or the outer surface of the piston 4 are shaped such that a seal 49' or a plurality of seals 49', 49" are only in a sealing contact with, both, the bonnet 1 and the piston 4 in a fully closed position of the valve and preferably in positions of the valve, in which it is close to being closed, i.e. in positions in which the valve is partially open to a small degree. Once the piston 4 is moved towards the bonnet 1 and the valve is thus at least partially opened, the seals 49', 49" remain in contact either only with the piston 4 in the embodiment of FIG. 1 or with the bonnet 1, in an alternative embodiment of the invention. The invention may be carried out with any number of seals 49', 49".

The smaller diameter portion 14 of the inner surface 13 of the bonnet 1 guides the upper guiding and sealing portion 42 only in as much, as a contact between the bonnet 1 and the piston 4 is maintained via seals 49', 49". The larger diameter portion 15 of the inner surface 13 of the bonnet 1 may be so wide as to allow for a gap between the inside of the larger diameter portion 15 and the seals 49', 49' of the piston 4.

The two different diameter portions 14, 14'; 15, 15' of the bonnet and/or of the piston 4 ensure that the seals 49', 49" are only significantly compressed in the closed position of the valve. The larger diameter upper portion 15' of the piston 4 may correspond to the upper guiding and sealing portion 42. The smaller diameter lower portion 14' of the piston may comprise portions of the piston tube 43.

When the valve is in an open or partially open position, the bonnet 1 and the piston 4 are spaced apart sufficiently in a radial direction for reducing or eliminating the compression of the seals 49', 49" provided between the piston 4 and the bonnet 1. In open positions of the valve, the seals 49', 49" may not be compressed by the bonnet 1 and the piston 4, as the bonnet 1 and the piston 4 are further spaced apart from each other in the area close to the seals 49', 49".

The presently described invention makes it possible to provide a piston tube 43 with a reduced central diameter, compared to the upper and lower portions of the piston 4, i.e. the upper guiding and sealing portion 42 and the bottom closing portion 41. Consequently, mores space is provided around the piston tube 43 and between the piston tube 43 and the inside walls of the housing 2. This means that a high pressure gradient acting on the piston tube 43 acts on its considerably reduced surface area, i.e. in a radial direction of the piston 4, compared to valves known from prior art. As a result, the forces acting on the piston tube 43 in a radial direction are reduced. These forces may push the piston 4 in a radial direction and thereby force the piston 4 against the valve seat or other parts of the housing 2. When the piston 4 is thus pushed against the housing 2, the piston 4 may become stuck and it may be hard to open or close the valve as a result.

Furthermore, due to the reduced diameter of the piston tube 43, a larger volume for fluid flow is provided between the housing 2 and the piston tube 43. The larger available flow volume reduces the likelihood of turbulences, which are detrimental to the valve performance.

The smaller diameter bottom portion 14 of the bonnet 1 and/or the larger diameter upper portion 15' of the piston 4 extend about 2%, less than 5%, preferably less than 10% and more preferably less than 20% of the valve stroke in an axial direction of the valve. The given values may be approximate exemplary values. The actual values any may be greater or smaller. They may be in the range of 1%-3%, 3%-7%, 7%-13% or 13%-25%.

The extension of the smaller diameter bottom portion 14 of the bonnet 1 and/or of the larger diameter upper portion

15' of the piston 4 determines the valve positions, at which the bonnet 1 is sealed against the piston 4.

The axial direction of the valve may correspond to the longitudinal direction of the spindle 3. A radial and circumferential direction of the valve may also be referenced to the spindle 3 and may correspond to the radial and circumferential direction of the spindle 3. The upper direction of the valve may be oriented from the housing 2 towards the bonnet 1 and the lower direction may be oriented from the bonnet 1 towards the housing 2, when used to describe features of the valve.

The bonnet 1 comprises two concentric protrusions 11, 12 formed as hollow cylinders, between which the upper guiding and sealing portion 42 is at least partially guided. The protrusions 11, 12 may be fully cylindrical or may comprise cylindrical portions. The two concentric protrusions 11, 12 may be formed integrally with the bonnet 1. The concentric protrusions 11, 12 make it possible for the piston 4 to interact with the bonnet 1 via two radially spaced apart surfaces. The inner surface of the outer protrusion 12 may guide the piston 4 at least partially during its opening and closing movement while an inner edge of a bottom-most portion of the inner protrusion 11 may contact the spindle 3 in a fully open position of the valve. This contact between the spindle 3 and the inner protrusion 11 may seal the inside of the valve and in particularly the pressure balancing chamber 40 against the outside of the valve. The spindle 3 may comprise a bottom portion having the widest diameter of the entire spindle 3. The bottom portion of the spindle 3 may be adjacent to a central portion of the spindle 3 with an intermediate diameter. A conical portion forming an outer edge of the spindle 3 may be provided between the bottom portion and the central portion of the spindle 3 for abutting the inner protrusion 11.

The pressure balancing chamber 40 is connected to the fluid passage 23 via the pressure balancing passage 31. The pressure balancing passage 31 is provided within the spindle 3 and within the piston 4 and is formed as a conduit leading from the pressure balancing chamber 40, into and down the spindle 3 and through the bottom closing portion 41 of the piston 4.

The pressure balancing passage 31 may therefore extend through the spindle 3 and/or through the bottom closing portion 41. It may be divided into two longitudinal portions, which may be angled to each other, preferably at an angle of 90°.

In an alternative embodiment, the pressure balancing passage 31 does not comprise any portions within the spindle 3. Rather, a direct fluid connection from the pressure balancing chamber 40, through the bottom closing portion 41 and to the fluid passage 23 is provided. The term pressure balancing passage 31 may comprise any number of conduits connecting the pressure balancing chamber 40 to the fluid passage 23.

In the closed position of the valve shown in FIG. 1, the piston 4 is supported by the spindle 3, the bonnet 1 and the housing 2. The piston 4 is in contact with the valve seat of the housing 2 in the valve's closed position.

The pressure balancing passage 31 or passages may be arranged in an axial direction of the valve. A first port of the pressure balancing passage 31 connected to the pressure balancing chamber 40 may be above a second port of the pressure balancing passage 31 connected to the fluid passage 23.

There may be no radially oriented pressure balancing passages 31, although some portions of a generally axially oriented pressure balancing passage 31 may extend in the radial direction. For example, the first portion of the pressure balancing passage 31 leading from the pressure balancing chamber 40 and into the spindle 3 may be oriented radially with respect to the spindle 3.

The upper guiding and sealing portion 42 comprises only the extreme end of the piston 4. It may correspond to less than half, preferably less than a fourth or less than a fifth of the entire length of the piston 4. As the guiding and sealing portion 42 is situated at the extreme upper end of the piston 4, the volume of the pressure balancing chamber 40 and the valve stroke can be maximized, while the piston 4 diameter can be kept to a minimum.

The piston 4 is sealed against the bonnet 1 only at the upper guiding and sealing portion 42 and only in the closed position of the valve. The upper guiding and sealing portion 42 may be the only sealing portion of the valve, which seals the piston 4 against the bonnet 1. The short extension of this portion ensures that most of the piston 4 is of considerably smaller diameter, than what is known from the art, yielding all the advantages described above.

The spindle 3 is coupled, preferably rotatably coupled, to the piston tube 43 via balls 44. The balls 44 may be inserted between the spindle 3 and the piston tube 43 via a hole within the piston tube 43. When the spindle 3 is turned, the balls 44 transfer an axial force between the spindle 3 and the piston tube 43 for moving the piston tube 43 along together with the rotated and translated spindle 3.

In the embodiment of FIG. 1, a bushing 45 is provided at an extreme end of the spindle 3 and between the spindle 3 and the bottom closing portion 41. The bushing 45 facilitates the relative rotation between the spindle 3 and the piston 4. It may contact the bottom closing portion 41 via a circular face and/or the piston tube 43 via a cylindrical face.

The bottom closing portion 41 comprises an outer flange 46 and an inner flange 47 between which a sealing element 48 is provided. The inner flange 47 may be formed integrally with the piston tube 43. The inner flange 47 may comprise threaded holes for screws and/or parts of the pressure balancing passage 31.

In the embodiment of FIG. 1, a sliding sleeve 16 is provided between the piston 4 and the bonnet 1. The sliding sleeve 16 may be in contact with the upper guiding and sealing portion 42, in particular in the closed position of the valve. The sliding sleeve 16 may comprise a complex inner and outer geometry with the smaller inner diameter at a bottom portion 14 than at an upper portion 15. It may be regarded as part of the bonnet 1 but it is not formed integrally with the bonnet 1. It may be welded to the bonnet 1 or otherwise connected to the bonnet 1.

In a set comprising two of the presently described valves, the valves may be fluidly connected to a port for a third valve, wherein the port is provided between the two valves. The port can be connected to a third and possibly different type of valve. If the third valve needs to be exchanged or serviced, the two presently described valves can be shut to disconnect the third valve from any fluid flow.

Figure 2:
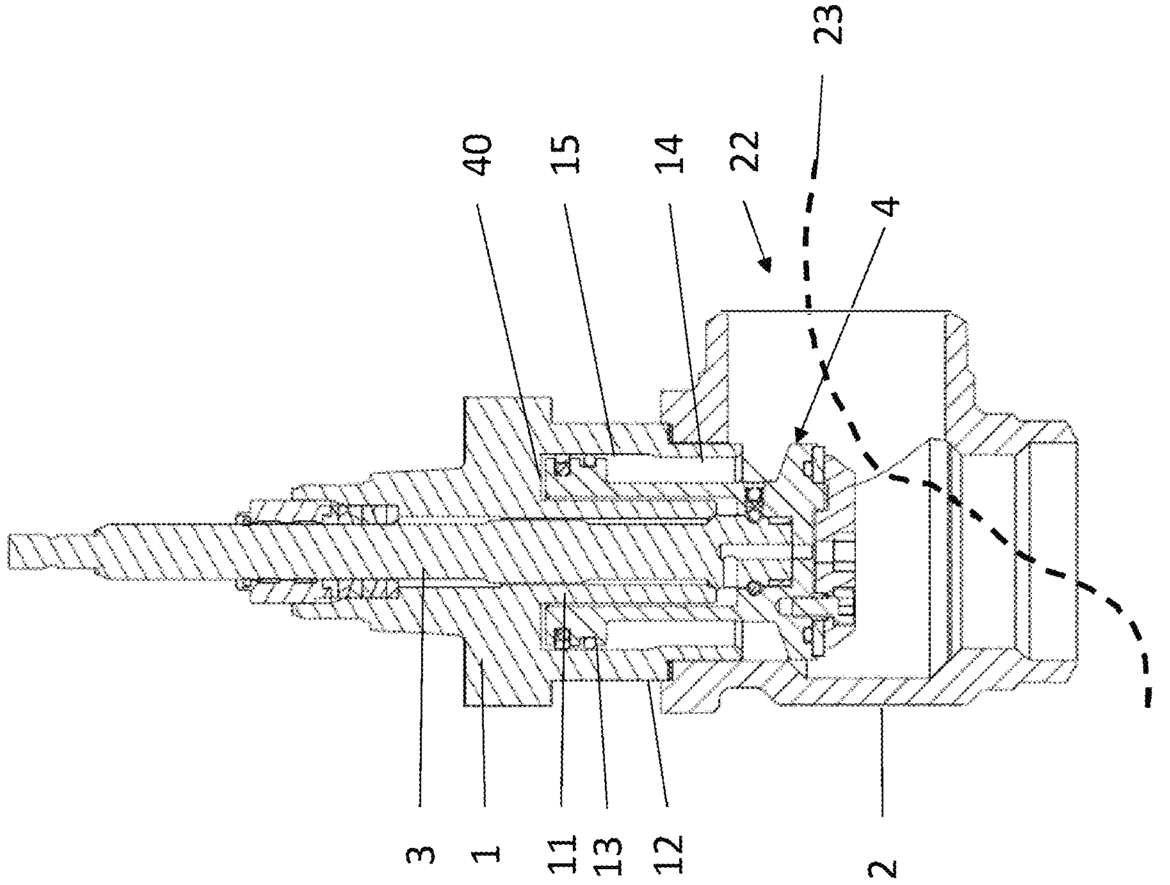
FIG. 2: sectional view of another embodiment of the invention in its open position.

FIG. 2 is a sectional view of another embodiment of the invention in the valve's open position. In the open position of the valve, the piston 4 is supported only by the spindle 3 and the bonnet 1. This is also the case in partially open positions of the valve. In the opened positions of the valve, i.e. the partially and fully opened positions, the piston 4 does not contact the housing 2. Rather it is only in contact with the spindle 3 and the bonnet 1.

In this embodiment of the valve, the bonnet 1 is formed integrally with the protrusions 11, 12. The bonnet 1 is inserted partially into the housing 2 and connected directly to the housing 2. No separate sliding sleeve 16 is provided between the piston 4 and the bonnet 1. The inner surface 13 of the external protrusion 12 is shown to have two different diameter portions 14, 15, just like in the embodiment of FIG. 1.

The integral bonnet 1 may comprise some connection geometry for connecting the bonnet 1 to the housing 2, a thread for connecting the bonnet 1 to the spindle 3 and/or some walls bounding the pressure balancing chamber 40. The bonnet 1 may comprise a threaded portion for screwing the bonnet 1 to the housing 2.

The pressure balancing chamber 40 has the smallest volume in the open valve position of FIG. 1. Most of the volume of the pressure chamber 40 is provided within the structure of the bonnet 1 in the open position of the valve.

FIGS. 3*a*-3*d* are detailed views of two embodiments of the valve in closed positions of the valves. The external protrusions 12 are formed integrally with the bonnet 1. Each of the inner surfaces 13 of the bonnet 1 comprise a smaller diameter at a bottom portion 14 than at an upper portion 15. As shown in more detail in FIG. 3*b*, in the embodiment shown in FIG. 3*a*, a short conical portion 17 may be provided between the larger diameter upper portion 15 and the smaller diameter bottom portion 14. The short conical portion 17 may be substantially shorter than both, the larger diameter upper portion 15 and the smaller diameter bottom portion 14. It may extend less in the axial direction than the upper guiding and sealing portion 42.

Figures 3A, 3B, 3C, 3D:
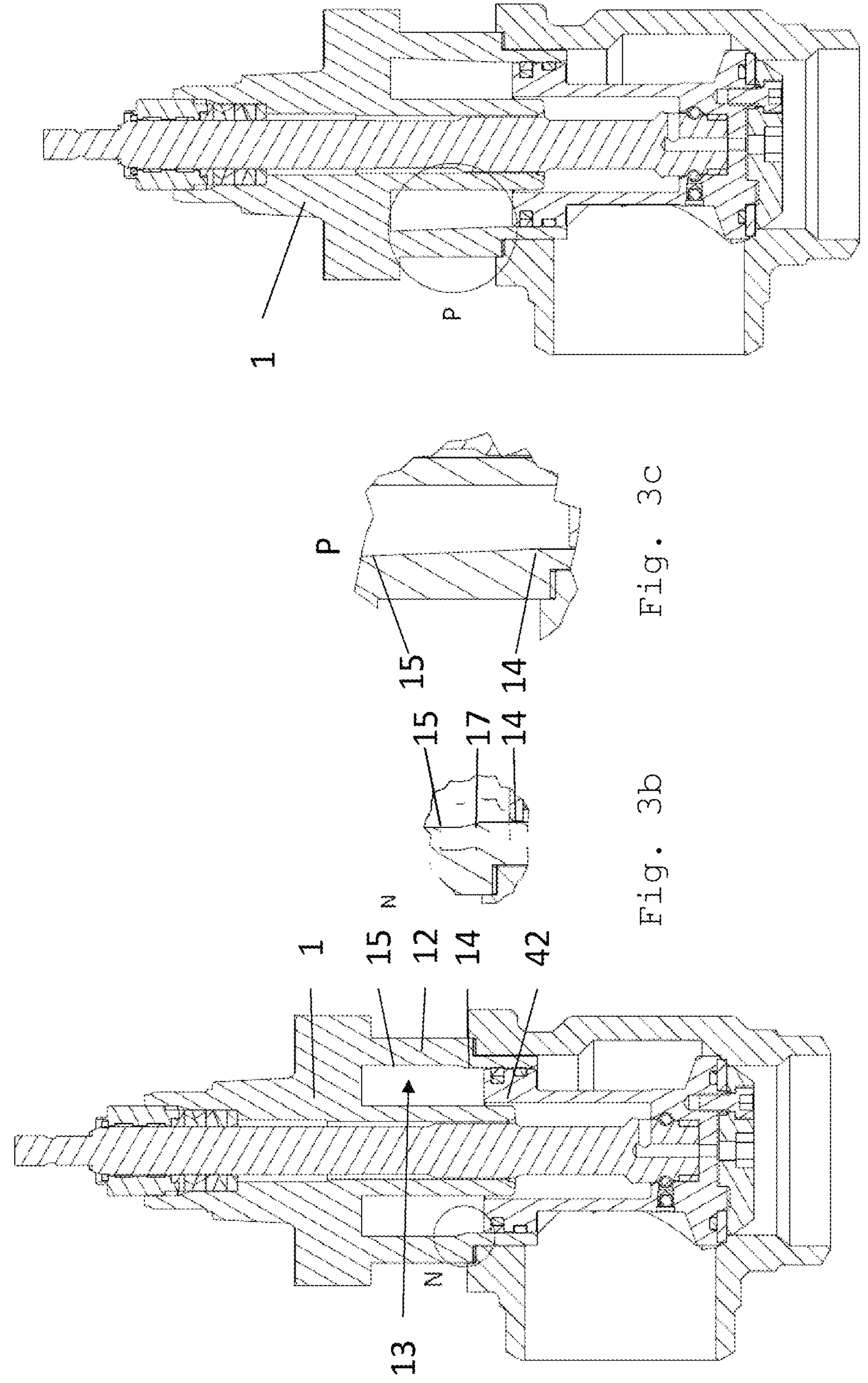
FIGS. 3*a*-3*d*: detailed views of two embodiments of the valve.

In the embodiment shown in FIG. 3*d*, and in more detail in FIG. 3*c*, a short conical portion 17 is non-existent. The smaller diameter bottom portion 14 may be adjacent to the larger diameter upper portion 15. The larger diameter upper portion 15 may be entirely or partially shaped conically. It may have a non-constant, varying inner diameter.

Figure 4B:
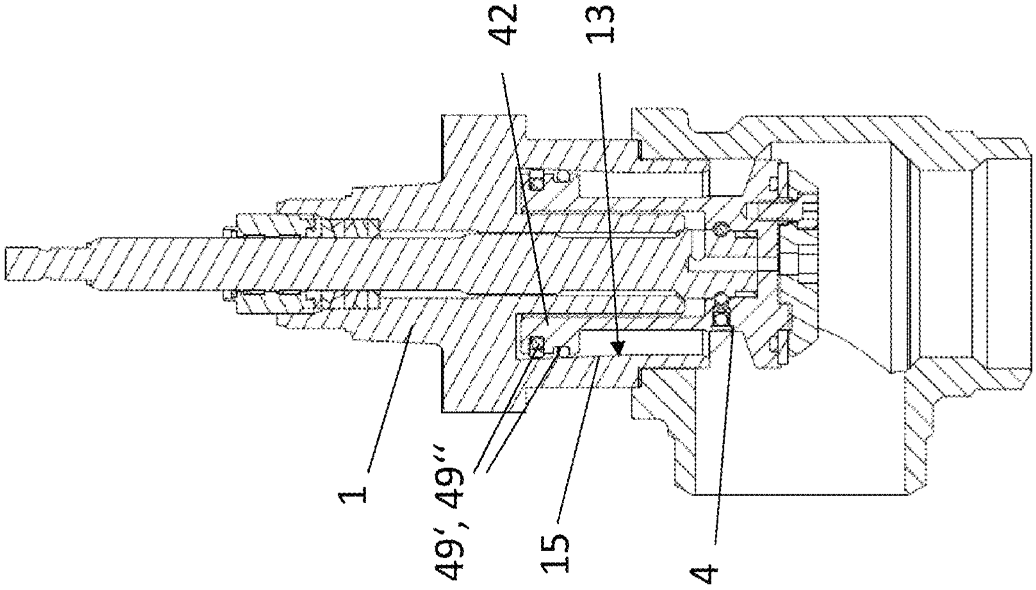
FIGS. 4*a*, 4*b*: sectional views of two embodiments of the valve in open positions.
Figure 4A:
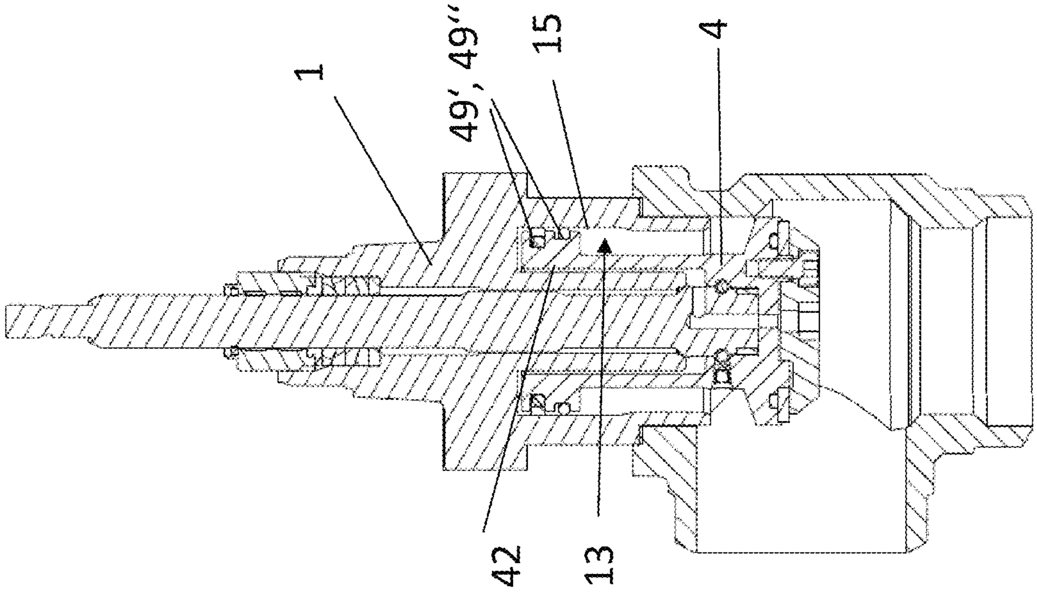

FIGS. 4*a* and 4*b* are sectional views of the two embodiments of the valve shown in FIGS. 3*a*-3*d* but in open positions of the valves. The pistons 4 are shown in their retracted positions and partially within the bonnets 1. In the open positions of the valve, the larger diameter upper portion 15 of the inner surfaces 13 of the bonnet 1 ensures that the seals 49', 49" are not in simultaneous contact with the bonnet 1 and upper guiding and sealing portion 42. The seals 49', 49" are not compressed between the bonnet 1 and the upper guiding and sealing portion 42. As the valve may be set in its open position during most of its life, the relaxed state of the seals 49', 49" increases their longevity.

Figure 5B:
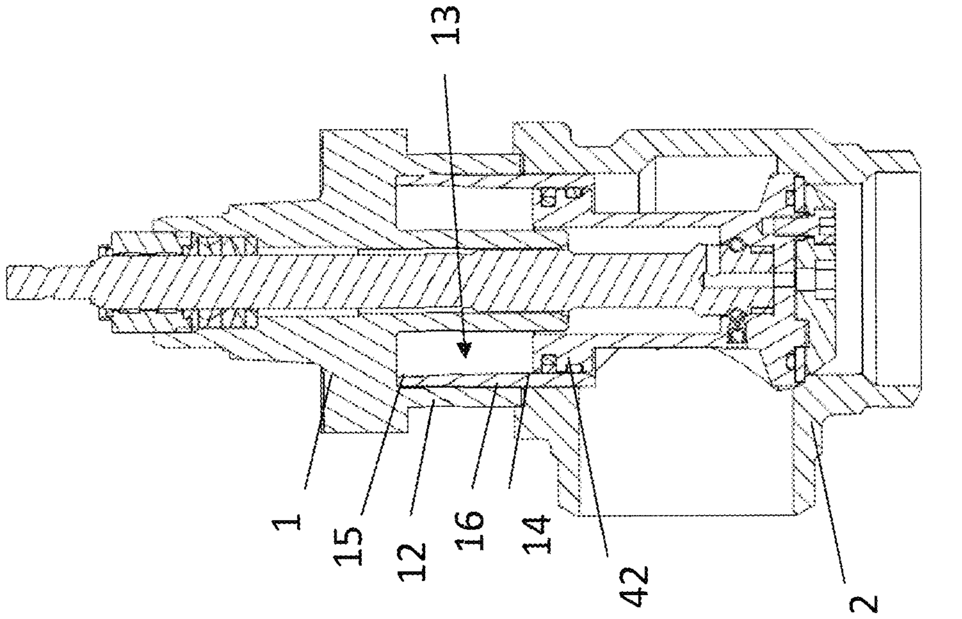
FIGS. 5*a*, 5*b*: sectional views of two embodiments of the valve in closed positions.
Figure 5A:
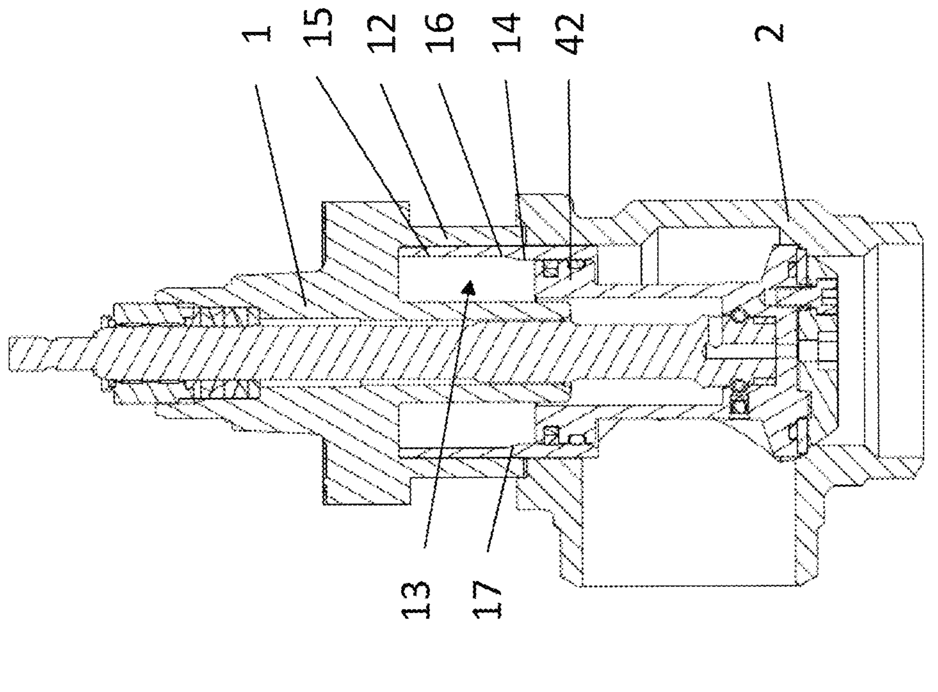

FIGS. 5*a* and 5*b* show sectional views of two further embodiments of the valve in closed positions. These embodiments comprise a sliding sleeve 16 each, which is connected to the bonnet 1. The bonnet 1 and the sliding sleeve 16 are not formed integrally but separately. They may be welded to each other or connected otherwise. The outer protrusion 12 may extend less in an axial direction than the sliding sleeve 16. The sliding sleeve 16 may be partially inserted into the bonnet 1. An outer cylindrical surface of the sliding sleeve 16 may be in close contact with the outer protrusion 12. An inner face 13 of the sliding sleeve 16 may comprise a smaller diameter bottom portion 14 and a larger diameter upper portion 15. As in the case in the embodiments of FIGS. 3*a* to 3*d*, a short conical portion 17 may or may not be provided between the smaller diameter bottom portion 14 and a larger diameter upper portion 15. Similarly, the larger diameter upper portion 15 may be non-cylindrical and may be conically shaped instead.

The sliding sleeve 16 may be connected to the bonnet 1 on one of its sides and to the housing 2 on an opposite side. The sliding sleeve 16 may be partially inserted into the housing 2. The length of the siding sleeve 16 may correspond to the valve stroke combined with the axial extension of the upper guiding and sealing portion 42. The siding sleeve 16 may comprise a threaded portion at its bottommost position for screwing the sliding sleeve 16 to the housing 2. The outer protrusion 12 may be partially inserted into the housing 2.

Figure 6B:
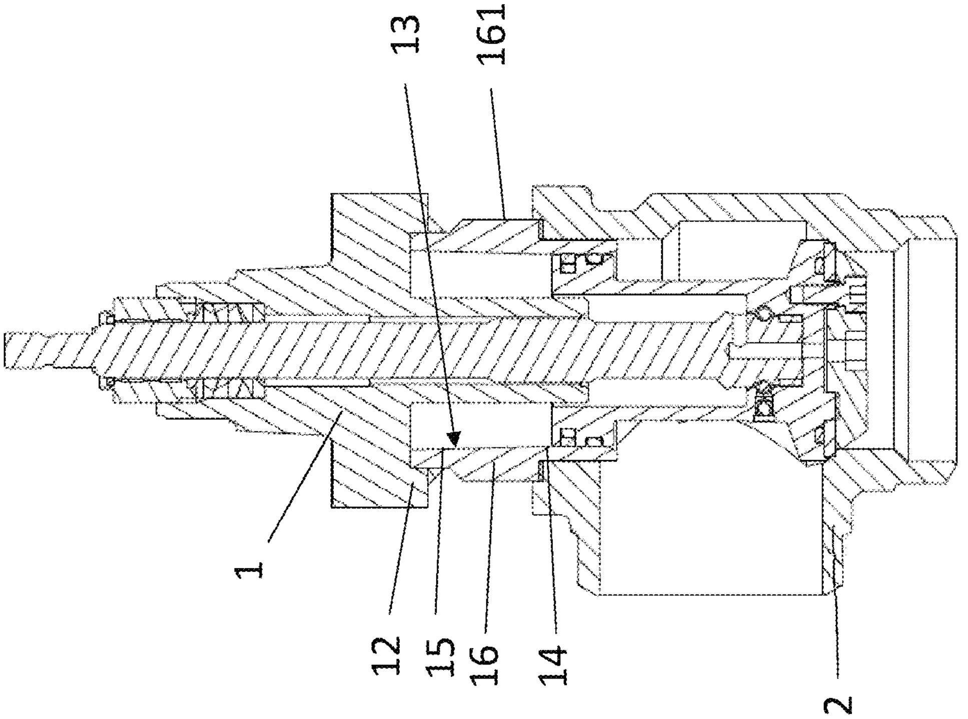
FIGS. 6*a*, 6*b*: sectional views of two embodiments of the valve in closed positions.
Figure 6A:
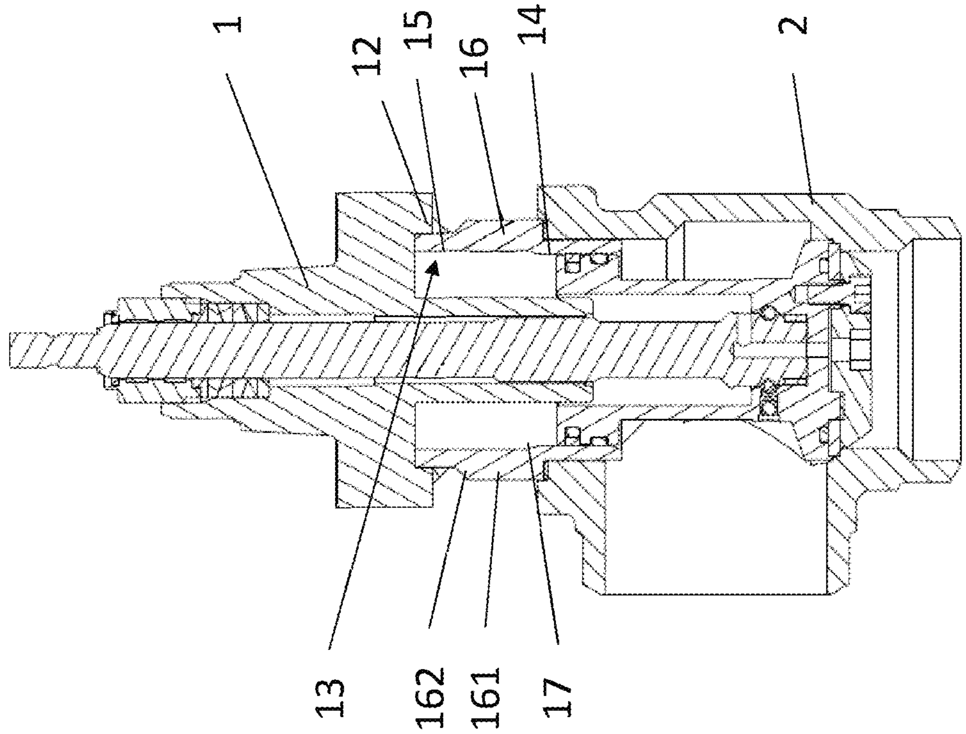

FIGS. 6*a* and 6*b* show sectional views of two embodiments similar to the one shown in FIG. 1. The valves are shown in their closed positions. The outer protrusion 12 extends only a short distance of less than the axial extension of the upper guiding and sealing portion 42. The outer protrusion 12 may be completely absent.

The bonnet 1 and the sliding sleeve 16 are not formed integrally. They may be welded to each other or connected otherwise. The sliding sleeve 16 may be partially inserted into the bonnet 1 or not inserted into the bonnet 1 at all. An outer cylindrical surface of the sliding sleeve 16 may be in close contact with the outer protrusion 12. A radially outermost portion 161 of the sliding sleeve 16 may be provided at an axially central position of the sliding sleeve 16. The radially outer portion 161 may protrude in a radial direction of the sliding sleeve 16 and/or may abut the housing 2. The radially outermost portion 161 may comprise a conical outer face 162, facing the bonnet 1. The sliding sleeve 16 may extend into the housing 2.

An inner face 13 of the sliding sleeve 16 may comprise a smaller diameter bottom portion 14 and a larger diameter upper portion 15. As in the case in the embodiments of FIGS. 6*a* and 6*b*, a short conical portion 17 may or may not be provided between the smaller diameter bottom portion 14 and a larger diameter upper portion 15. Similarly, the larger diameter upper portion 15 may be non-cylindrical and may be conically shaped instead.

Figure 7:
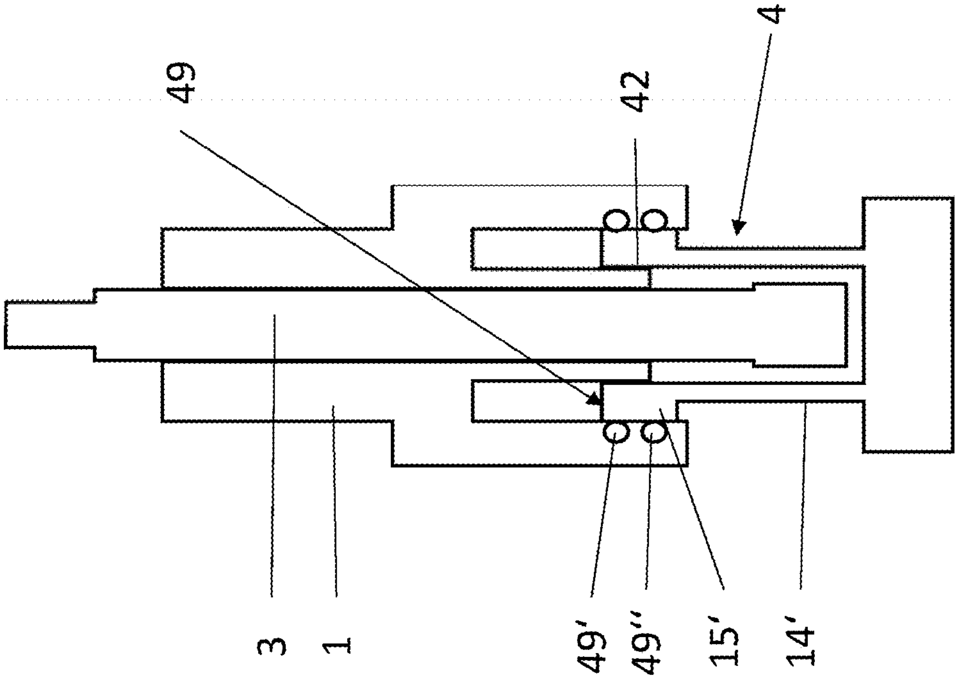
FIG. 7: schematic view of a further embodiment of the invention.

FIG. 7 is a schematic view of a further embodiment of the invention. Here, the position of the seals 49', 49" is inverted compared to the previously shown embodiments. At least one seal 49', 49" is or exactly two seals 49', 49" are fixedly coupled to the bonnet 1 instead of the upper guiding and sealing portion 42. The piston 4 comprises a smaller diameter bottom portion 14' and an larger diameter upper portion 15' at its upper guiding and sealing portion 42.

When the piston 4 is moved upwards towards an open position of the valve, the seals 49', 49" are no longer in contact with the upper guiding and sealing portion 42. Rather, the smaller diameter bottom portion 14' is situated close to the seals 49', 49" but not in contact with the seals 49', 49". The seals 49', 49" are therefore not compressed in open positions of the valve.

The invention may comprise any functional combination of features of the presently described embodiments.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve for a refrigeration application comprising a bonnet connected to a housing with two fluid openings, a spindle fully penetrating the bonnet and reaching inside the housing, and a piston with an upper guiding and sealing portion with a seal section, a bottom closing portion for opening and closing a fluid passage between the two fluid openings, and a piston tube between the upper guiding and sealing portion and the bottom closing portion, wherein the spindle engages the piston for moving it between a closed position and an open position of the valve, wherein a pressure balancing chamber is provided above and within the piston, and wherein an inner surface of the bonnet guiding the upper guiding and sealing portion and/or an outer surface of the piston has a smaller diameter at a bottom portion than at an upper portion such that a seal in the seal section of the piston is more compressed by the bonnet in a radial direction of the valve when the piston is in one position of a plurality of valve stroke positions in an axial direction of the valve than when the piston is in another position of the plurality of valve stroke positions.

2. The valve according to claim 1, wherein the smaller diameter at the bottom portion of the bonnet and/or a larger diameter upper portion of the piston extend 2% of a valve stroke in the axial direction of the valve.

3. The valve according to claim 1, wherein the bonnet comprises two concentric protrusions formed as hollow cylinders, between which the upper guiding and sealing portion is at least partially guided.

4. The valve according to claim 3, wherein one of the protrusions abuts the spindle in a fully open position of the valve for sealing the valve against an outside.

5. The valve according to claim 1, wherein the pressure balancing chamber is connected to the fluid passage via a pressure balancing passage within the spindle and/or within the piston, and/or that the piston is supported only by the spindle and the bonnet during at least some or all open positions of the valve.

6. The valve according to claim 1, wherein the upper guiding and sealing portion comprises only the extreme end of the piston and/or corresponds to less than half of an entire length of the piston.

7. The valve according to claim 1, wherein the piston is sealed against the bonnet only at the upper guiding and sealing portion.

8. The valve according to claim 1, wherein the pressure balancing chamber is connected to the fluid passage via a pressure balancing passage within the bottom closing portion.

9. The valve according to claim 1, wherein the bonnet is formed integrally and/or inserted partially into the housing and/or connected directly to the housing.

10. The valve according to claim 1, wherein a bushing is provided at or close to an extreme end of the spindle and between the spindle and the bottom closing portion.

11. The valve according to claim 1, wherein the bottom closing portion comprises an outer flange and an inner flange between which a sealing element is provided.

12. The valve according to claim 1, wherein the seal in the seal section is the only seal that seals the upper guiding and sealing portion of the piston with the bonnet or there are exactly two seals in the seal section and the seal in the seal section being one of the exactly two seals.

13. The valve according to claim 1, wherein a sliding sleeve is provided between the piston and the bonnet.

14. The valve according to claim 1, wherein the smaller diameter bottom portion of the bonnet and/or the larger diameter upper portion of the piston extend less than 5% of the valve stroke in the axial direction of the valve.

15. The valve according to claim 1, wherein the smaller diameter bottom portion of the bonnet and/or the larger diameter upper portion of the piston extend less than 20% of the valve stroke in the axial direction of the valve.

16. The valve according to claim 1, wherein the upper guiding and sealing portion comprises only the extreme end of the piston and/or corresponds to less than a fourth of an entire length of the piston.

17. The valve according to claim 1, wherein the upper guiding and sealing portion comprises only the extreme end of the piston and/or corresponds to less than a fifth of an entire length of the piston.

18. The valve according to claim 1, wherein the valve is a shut-off and/or regulating valve.

19. The valve according to claim 1, wherein the pressure balancing chamber is fluidly connected to the passage.

20. The valve according to claim 1, wherein the seal in the seal section is not compressed by the bonnet in the radial direction when the piston is in some positions of the plurality of valve stroke positions.

21. The valve according to claim 12, wherein the only seal is fixedly coupled to the bonnet or the exactly two seals are fixedly coupled to the bonnet.

* * * * *